United States Patent
Li et al.

(10) Patent No.: US 7,436,685 B2
(45) Date of Patent: Oct. 14, 2008

(54) PIECEWISE ON-TIME MODULATION APPARATUS AND METHOD FOR A POWER FACTOR CORRECTOR

(75) Inventors: Hong-Chun Li, Gaushu Township, Pingtung County (TW); Chean-Lung Tsay, Hsinchu (TW); Dan Chen, Taipei (TW)

(73) Assignee: Richtek Technology Corp., Hsinchu (TW)

( * ) Notice: Subject to any disclaimer, the term of this patent is extended or adjusted under 35 U.S.C. 154(b) by 336 days.

(21) Appl. No.: 11/091,501

(22) Filed: Mar. 29, 2005

(65) Prior Publication Data
US 2005/0219871 A1  Oct. 6, 2005

(30) Foreign Application Priority Data
Mar. 30, 2004  (TW) ............................. 93108604 A (51) Int. Cl.
*H02M 3/335* (2006.01)
(52) U.S. Cl. .................................. 363/21.01; 363/21.1

(58) Field of Classification Search .................. 363/20, 363/21.01, 21.04, 21.09, 21.1, 21.11, 95, 363/97, 131
See application file for complete search history.

(56) References Cited

U.S. PATENT DOCUMENTS

| | | | | |
|---|---|---|---|---|
| 5,408,401 | A * | 4/1995 | Miyazaki | 363/21.08 |
| 5,742,151 | A * | 4/1998 | Hwang | 323/222 |
| 6,118,254 | A * | 9/2000 | Faulk | 320/141 |
| 6,172,885 | B1 * | 1/2001 | Feldtkeller | 363/21.1 |
| 6,646,897 | B1 * | 11/2003 | Lomax et al. | 363/97 |
| 6,657,417 | B1 * | 12/2003 | Hwang | 323/222 |
| 6,703,817 | B2 * | 3/2004 | Cohen | 323/282 |
| 2003/0222627 | A1 * | 12/2003 | Hwang | 323/222 |

* cited by examiner

*Primary Examiner*—Adolf Berhane
(74) *Attorney, Agent, or Firm*—Rosenberg, Klein & Lee (57) ABSTRACT

In a power factor corrector including a PWM switch to switch a line current generated from a line voltage to charge a boost capacitor to thereby generate an output voltage, a piecewise on-time modulation apparatus and method comprise comparing a line voltage dependent voltage with an output voltage dependent voltage to generate a comparison signal to determine the on-time of the PWM switch. When the line voltage is lower than a threshold, the on-time of the PWM switch varies with the line voltage, and when the line voltage is higher than the threshold, the on-time of the PWM switch is constant.

11 Claims, 11 Drawing Sheets

PIECEWISE ON-TIME MODULATION APPARATUS AND METHOD FOR A POWER FACTOR CORRECTOR

FIELD OF THE INVENTION

The present invention is related generally to a power factor correction (PFC) and more particularly, to a piecewise on-time modulation apparatus and method for power factor improvement.

BACKGROUND OF THE INVENTION

Power converter is almost an indispensable part for various electronic apparatus. Specifically, in an AC-to-DC converter, for electronic apparatus requesting large power, the power consumption as demanded possibly exceeds the rating, thereby having potentially interference upon other electronic apparatus. Therefore, power factor correction may be critical to electronic apparatus, since it may achieve functions of energy saving or power consumption reduction and efficiently reduce harmonic distortion occurred resulting in power contamination. The power factor reflects a relationship between an effective power and a total power consumption (i.e., apparent load power), and specifically the ratio of the effective power to the total power consumption. In essence, the greater the power factor is, the higher the power is effectively used.

Figure 1:
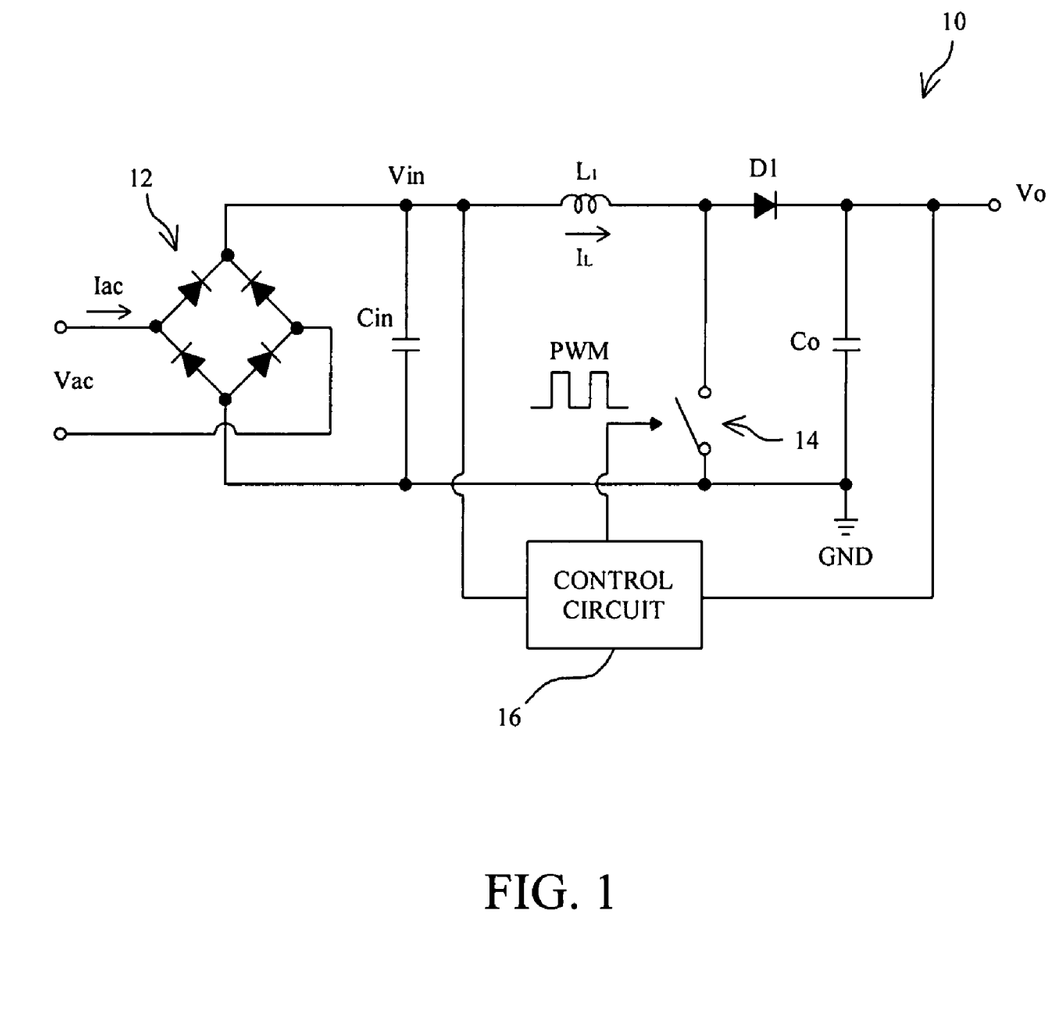
FIG. 1 shows a simplified diagram of a typical power factor corrector.
Figure 2:
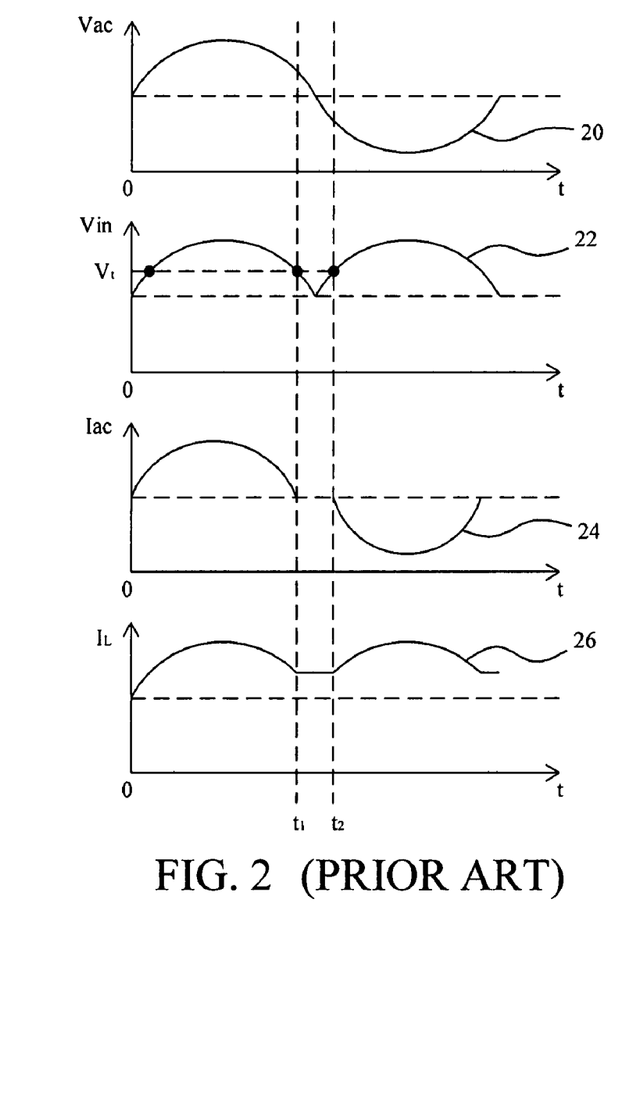
FIG. 2 shows the schematic waveforms of the AC input voltage, the line voltage, the AC input current, and the line current obtained from the power factor corrector shown in FIG. 1 using constant on-time modulation.

In a conventional power factor corrector, boost converter and pulse width modulation (PWM) are used to obtain a larger power factor. FIG. 1 shows a simplified diagram of a typical power factor corrector 10, in addition to a bridge rectifier 12 for converting an alternating current (AC) input voltage Vac to a line voltage Vin coupled to an inductor $L_1$ to generate a line current $I_L$ to further charge a boost capacitor $C_O$ so as to generate an output voltage $V_O$, which comprises a PWM switch 14 connected between the inductor $L_1$ and ground GND to switch the line current $I_L$ to flow to the boost capacitor $C_O$ or ground GND, and a control circuit 16 provides a PWM signal based on the line voltage Vin and the output voltage $V_O$ to switch the PWM switch 14. FIG. 2 shows the schematic waveforms of the AC input voltage Vac, the line voltage Vin, the AC input current Iac, and the line current $I_L$ obtained from the power factor corrector 10 shown in FIG. 1 using constant on-time modulation, designated with numerals 20, 22, 24 and 26, respectively. When the line voltage Vin is lower than a threshold $V_t$, due to the constant on-time of the PWM signal, there is not enough time period to draw sufficient energy from the input capacitor Cin. Accordingly, during the time period of from t1 to t2, the line current $I_L$ is maintained constant, and the waveforms 22 and 26 of the line voltage Vin and the line current $I_L$ are not identical. As a result, the total harmonic distortion of the system is serious.

Figure 3:
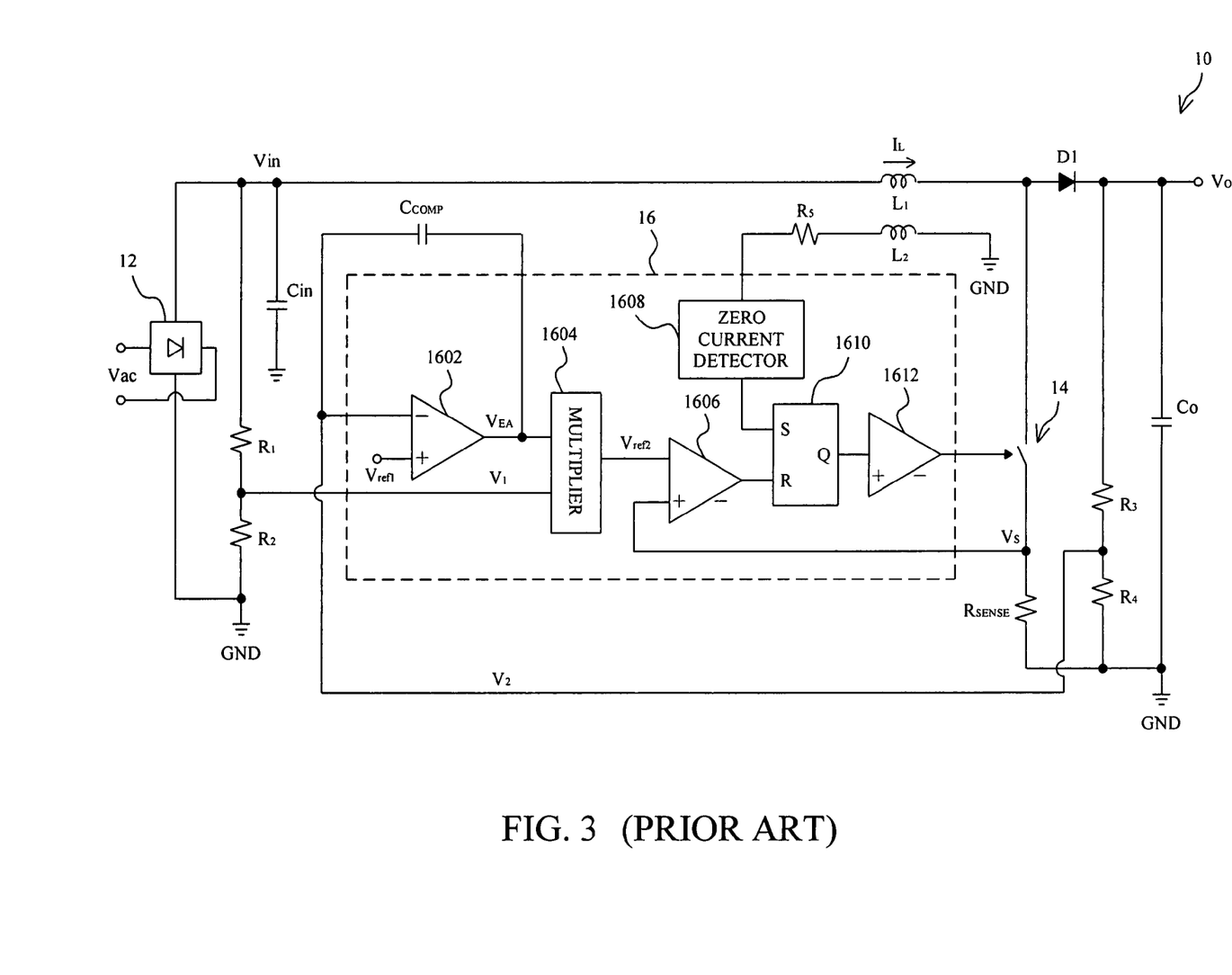
FIG. 3 shows a conventional circuit using multiplier technique for the power factor corrector of FIG. 1.

Alternatively, multiplier technique is generally employed in current power factor correctors to achieve power factor correction and harmonic distortion reduction. FIG. 3 shows a conventional circuit using multiplier technique for the power factor corrector 10 of FIG. 1. A voltage $V_1$ is generated by dividing the line voltage Vin by a voltage divider consisting of resistors $R_1$ and $R_2$ for one input of a multiplier 1604 in the control circuit 16. The output voltage $V_O$ is also divided by a voltage divider consisting of resistors $R_3$ and $R_4$ to generate a voltage $V_2$ for an error amplifier 1602 to compare with a reference voltage $V_{ref1}$ to thereby generate an error signal $V_{EA}$ for another input of the multiplier 1604. Accordingly, the multiplier 1604 generates a reference voltage $V_{ref2}$ for a comparator 1606. During the PWM switch 14 is on, the line current $I_L$ flows through a sense resistor $R_{SENSE}$, and a sense voltage $V_S$ is generated accordingly. The comparator 1606 compares the sense voltage $V_S$ with the reference voltage $V_{ref2}$ to generate an output connected to the reset input R of an RS latch 1610. As the line current $I_L$ increases, the sense voltage $V_S$ also increases. When the sense voltage $V_S$ is higher than the reference voltage $V_{ref2}$ the RS latch 1610 generates an output Q to turn off the PWM switch 14 by a driver 1612. Accordingly, the line current $I_L$ is redirected through a diode D1 to charge the boost capacitor $C_O$. When the line current $I_L$ decreases to zero, a zero current detector 1608 generates a signal to the set input S of the RS latch 1610 and therefore turns on the PWM switch 14.

Although the power factor corrector 10 may achieve good power factor and output voltage regulation by use of the multiplier 1604, due to the nonlinearity of the multiplier 1604, the overall architecture of the power factor corrector 10 becomes more complicated.

Therefore, it is desired a power factor corrector and method thereof that avoid using multiplier to achieve power factor correction and output voltage regulation, and reduces harmonic distortion.

SUMMARY OF THE INVENTION

One object of the present invention is to provide a piecewise on-time modulation apparatus and method for a power factor corrector.

Another object of the present invention is to provide a power factor corrector and method thereof that avoid using multiplier to achieve power factor correction and output voltage regulation.

Yet another object of the present invention is to provide a power factor corrector and method thereof that are capable of reducing the total harmonic distortion of the system.

In a power factor corrector including a PWM switch to switch a line current generated from a line voltage derived by rectifying an AC input voltage so as to charge a boost capacitor to thereby generate an output voltage, according to the present invention, a piecewise on-time modulation apparatus comprises a voltage source for generating a reference voltage dependent on the line voltage, a current source for generating a charging current dependent on the output voltage to further generate a charged voltage, a comparator for comparing the charged voltage with the reference voltage to thereby generate a comparison signal, and a PWM generator in response to the comparison signal for generating a PWM signal for the PWM switch.

In a power factor corrector including a PWM switch to switch a line current generated from a line voltage derived by rectifying an AC input voltage so as to charge a boost capacitor to thereby generate an output voltage, according to the present invention, a piecewise on-time modulation method comprises the steps of generating a reference voltage dependent on the line voltage, generating a charging current dependent on the output voltage, generating a charged voltage from the charging current, generating a comparison signal by comparing the charged voltage with the reference voltage, and generating a PWM signal in response to the comparison signal for the PWM switch.

In the circumstances that the reference voltage varies as the line voltage changes, when the line voltage is lower than a threshold, the reference voltage decreases as the line voltage increases. If the charging current is constant, i.e., the output voltage is fixed, the reference voltage increases as the line voltage decreases, and the charging time for the charged voltage to reach the reference voltage becomes longer and therefore the PWM switch has a longer on-time, such that more energy is drawn from the input capacitor. When the line voltage is equal to or higher than the threshold, the voltage source keeps the reference voltage constant, and thus the on-time of the PWM switch is also constant. Furthermore, since the charging current is generated based on the output voltage, the charging current decreases as the output voltage decreases, and accordingly, a longer charging time is required for the charged voltage to reach the reference voltage. Consequently, a longer time is induced for the line current to charge the boost capacitor, thereby achieving the output voltage regulation.

In a power factor corrector including a PWM switch to switch a line current generated from a line voltage derived by rectifying an AC input voltage so as to charge a boost capacitor to thereby generate an output voltage, according to the present invention, a piecewise on-time modulation apparatus comprises a voltage source for generating a reference voltage dependent on the output voltage, a current source for generating a charging current dependent on the line voltage to further generate a charged voltage, a comparator for comparing the charged voltage with the reference voltage to thereby generate a comparison signal, and a PWM generator in response to the comparison signal for generating a PWM signal for the PWM switch.

In a power factor corrector including a PWM switch to switch a line current generated from a line voltage derived by rectifying an AC input voltage so as to charge a boost capacitor to thereby generate an output voltage, according to the present invention, a piecewise on-time modulation method comprises the steps of generating a reference voltage dependent on the output voltage, generating a charging current dependent on the line voltage, generating a charged voltage from the charging current, generating a comparison signal by comparing the charged voltage with the reference voltage, and generating a PWM signal in response to the comparison signal for the PWM switch.

In the circumstances that the charging current varies as the line voltage changes, when the line voltage is lower than a threshold, the charging current is generated proportional to the line voltage, and accordingly, the lower the line voltage is, the lower the charging current is. If the reference voltage is constant, i.e., the output voltage is fixed, the on-time of the PWM switch becomes greater as the line voltage decreases, such that more energy is drawn from the input capacitor. When the line voltage is equal to or higher than the threshold, the charging current is kept fixed and the on-time of the PWM switch is maintained constant consequently. Furthermore, since the reference voltage is generated based on the output voltage, the reference voltage increases as the output voltage decreases, and accordingly, a longer charging time is required for the charged voltage to reach the reference voltage. Consequently, the PWM switch has a greater on-time and the line current charges the boost capacitor for a longer time period, thereby achieving the output voltage regulation.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 4:
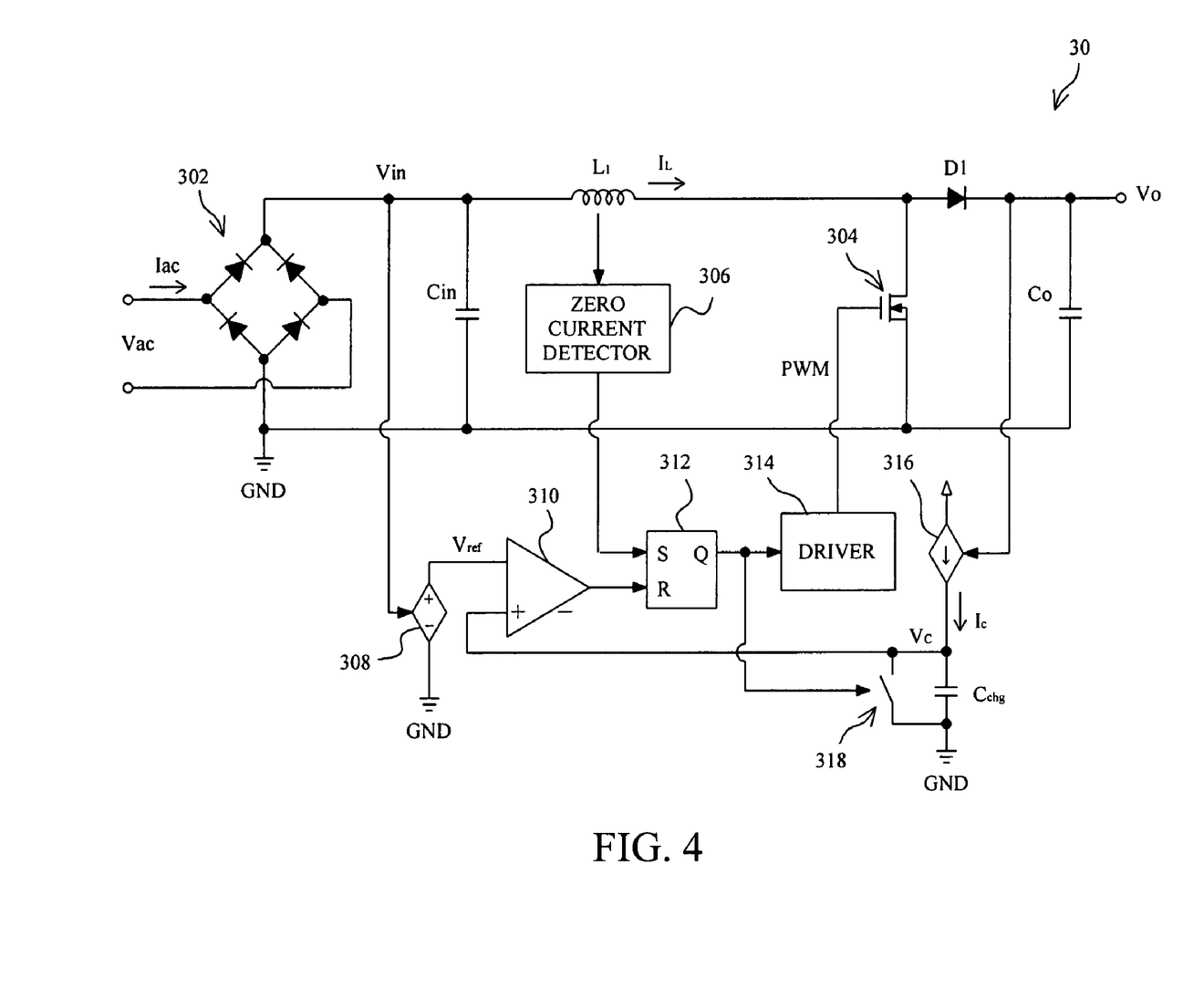
FIG. 4 shows an embodiment for a power factor corrector according to the present invention.

FIG. 4 shows a power factor corrector 30 according to the present invention. A bridge rectifier 302 converts an AC input voltage Vac to a line voltage Vin coupled to an inductor $L_1$ to generate a line current $I_L$ to charge a boost capacitor $C_O$ to generate an output voltage $V_O$. The power factor corrector 30 comprises a transistor 304 as a PWM switch connected between the inductor $L_1$ and ground GND to switch the line current $I_L$ to the boost capacitor $C_O$ or to ground GND. In the power factor corrector 30, a voltage source 308 generates a reference voltage $V_{ref}$ based on the line voltage Vin, a current source 316 generates a charging current $I_C$ based on the output voltage $V_O$ to charge a capacitor $C_{chg}$ to thereby generate a charged voltage $V_C$ thereon, and a comparator 310 compares the charged voltage $V_C$ with the reference voltage $V_{ref}$ to generate a comparison signal coupled to the reset input R of an RS latch 312. When the charged voltage $V_C$ on the capacitor $C_{chg}$ is equal to or higher than the reference voltage $V_{ref}$, upon the output of the comparator 310, the RS latch 312 will generate an output Q to have a driver 314 to generate a PWM signal to turn off the transistor 304. Accordingly, the line current $I_L$ is directed through a diode D1 to charge the boost capacitor $C_O$. Also by the output Q of the RS latch 312, a discharge switch 318 shunt to the capacitor $C_{chg}$ is turned on to discharge the capacitor $C_{chg}$. When the line current $I_L$ decreases to zero, a zero current detector 306 generates a detection signal to the set input S of the RS latch 312, and therefore the output Q of the RS latch 312 will turn on the transistor 304 and turn off the discharge switch 318.

Figure 5:
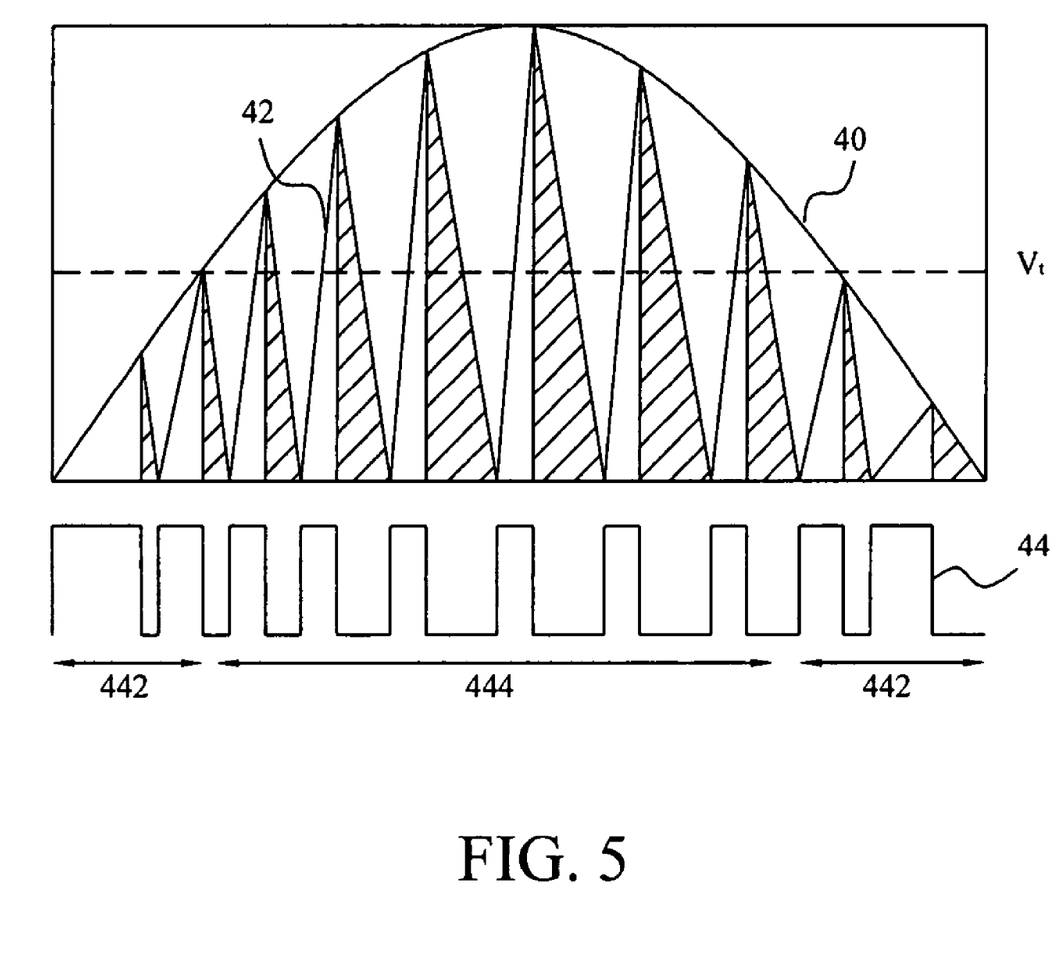
FIG. 5 shows the schematic waveforms of the line voltage, the line current and the PWM signal obtained from the power factor corrector of FIG. 4.

This embodiment is so designed with the reference voltage $V_{ref}$ as a function of the line voltage Vin, i.e., it varies with the line voltage Vin. FIG. 5 shows the schematic waveforms of the line voltage Vin, the line current $I_L$ and the PWM signal obtained from the power factor corrector 30, designated with numerals 40, 42 and 44, respectively. When the line voltage Vin (waveform 40) is lower than a threshold $V_t$, the reference voltage $V_{ref}$ decreases as the line voltage Vin increases. Accordingly, if the charging current $I_C$ is kept constant, i.e., the output voltage $V_O$ is unchanged, the charging time for the capacitor $C_{chg}$ to reach the reference voltage $V_{ref}$ decreases as the line voltage Vin increases, and therefore, the on-time of the PWM signal (waveform 44) varies with the line voltage Vin. Namely, the lower the line voltage Vin is, the greater the on-time of the PWM signal is. In this case, the ramp-up time of the line current $I_L$ increases, and therefore more energy is drawn from the input capacitor Cin, which will improve the total harmonic distortion of the power factor correction system. When the line voltage Vin becomes higher than the threshold $V_t$, the voltage source 308 keeps the reference voltage $V_{ref}$ at a constant and therefore the on-time of the PWM signal is maintained constant. By doing this, the system is enabled to enter the piecewise constant on-time control mode. As shown in FIG. 5, there are two regions 442 and 444 indicated for the waveform 44 of the PWM signal. In the region 442, the line voltage Vin is lower than the threshold $V_t$, and the on-time of the PWM signal 44 varies with the line voltage Vin. Particularly, the lower Vin generates the longer on-time. In contrast, in the region 444, the line voltage Vin is higher than the threshold $V_t$, and the on-time of the PWM signal is constant. In other words, the on-time of the PWM switch 304 is piecewise varied with the line voltage Vin during the half-wave cycle of the AC input voltage Vac. Specifically, the on-time of the PWM switch 304 is constant during the line voltage Vin higher than the threshold $V_t$, and is increased when the line voltage Vin is lower than the threshold $V_t$. In addition, since the charging current $I_C$ is determined dependent on the output voltage $V_O$, the charging current $I_C$ will change when the output voltage $V_O$ changes. For example, as the output voltage $V_O$ decreases, the charging current $I_C$ decreases, and therefore, the charging time for the capacitor $C_{chg}$ becomes longer, and the on-time of the transistor 304 is prolonged consequently, such that the output voltage $V_O$ increases, i.e., the output voltage $V_O$ is thus regulated.

In the modulation operations of the power factor corrector 30, initially, the output Q of the RS latch 312 is high and the PWM switch 304 turns on, and thus the line current $I_L$ increases in this period. Once the output Q of the RS latch 312 is set to high, hence the discharge switch 318 is off so as to enable the current source 316 to charge the capacitor $C_{chg}$ with the charging current $I_C$. When the capacitor $C_{chg}$ is charged to have the charged voltage $V_C$ thereon to reach the reference voltage $V_{ref}$, the comparator 310 resets the RS latch 312 by the comparison signal, and therefore the PWM switch 304 turns off, such that the boost capacitor $C_O$ is charged by the line current $I_L$. At the same time, the discharge switch 318 turns on by the output Q of the RS latch 312, and hence the capacitor $C_{chg}$ is discharged rapidly. During the off period of the PWM switch 304, the line current $I_L$ decreases linearly to zero, which triggers the zero current detector 306 to set the RS latch 312 by the detection signal for another new cycle.

Figure 6:
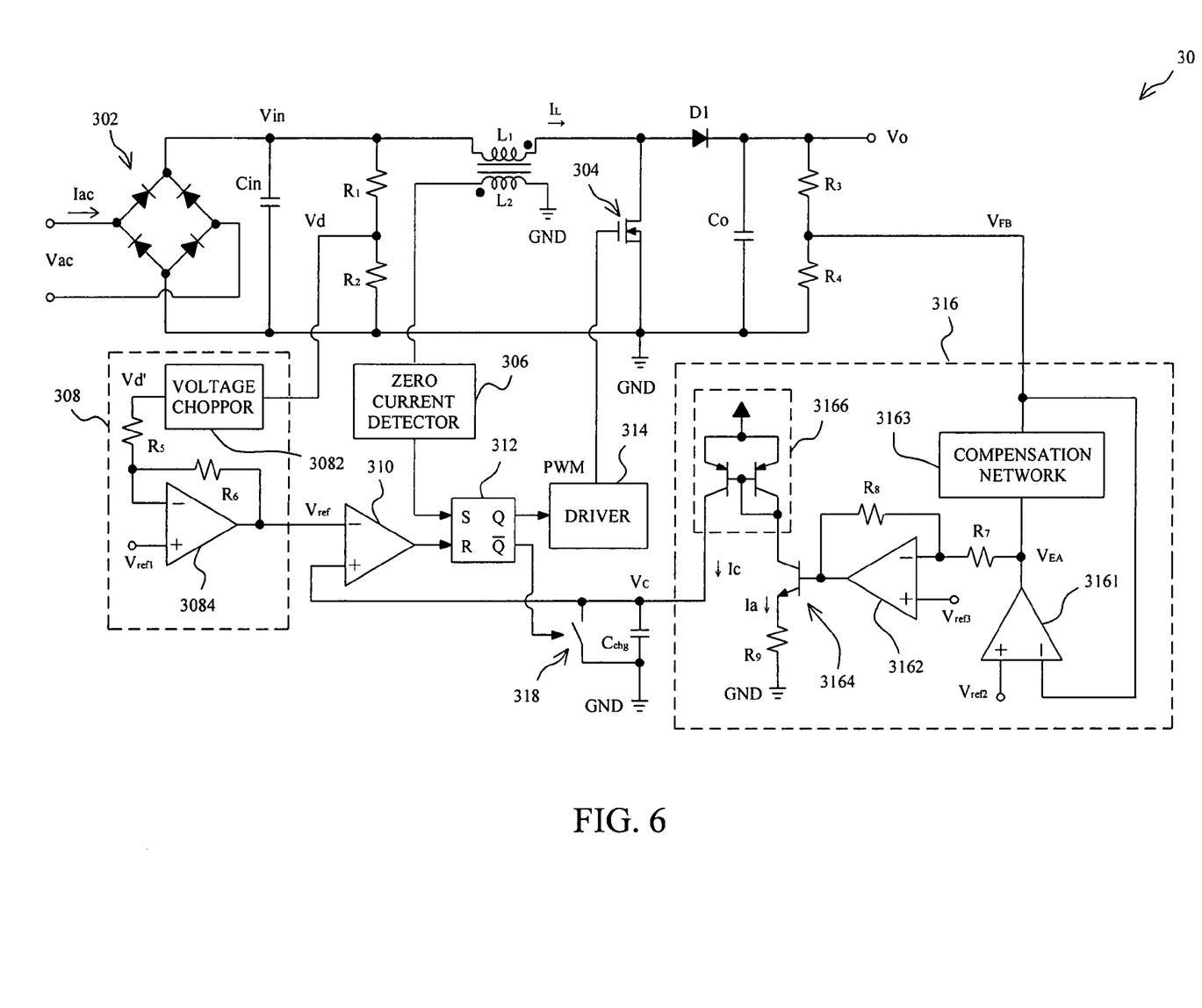
FIG. 6 shows an exemplary circuit for the power factor corrector of FIG. 4.
Figure 7:
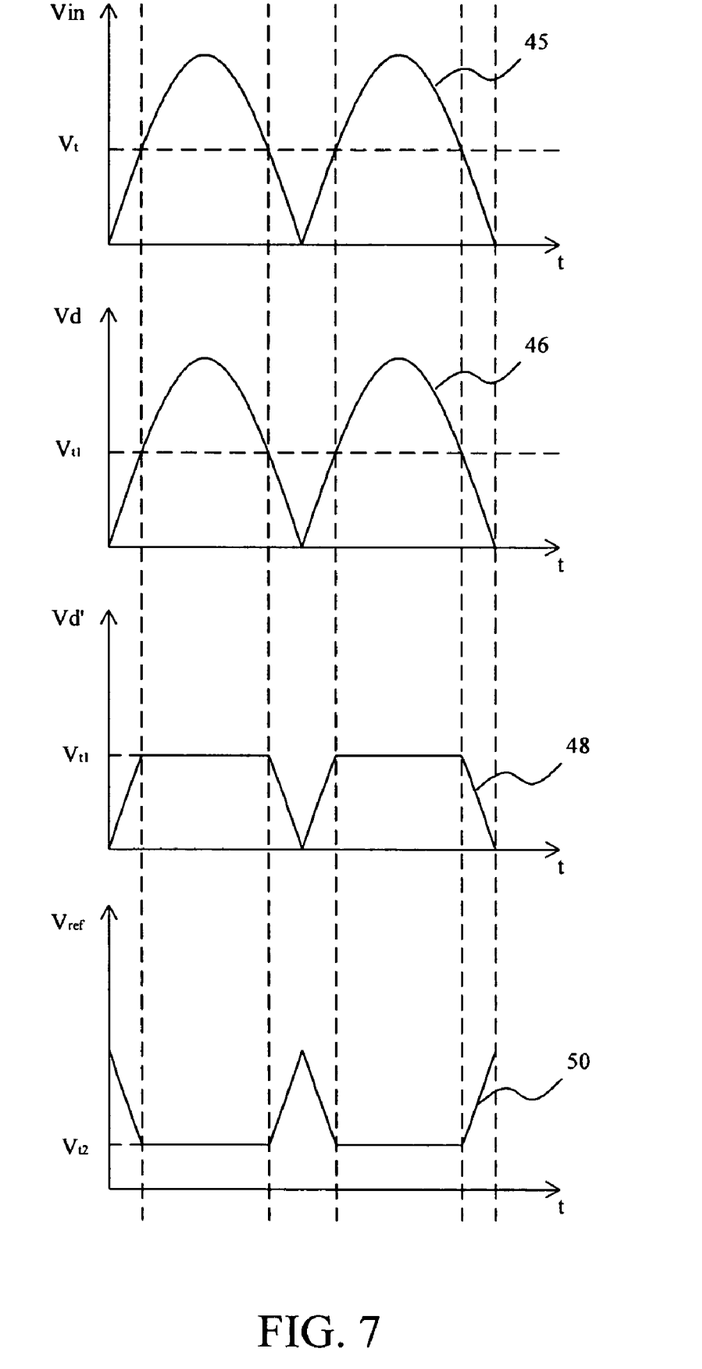
FIG. 7 shows the schematic waveforms of the line voltage, the divided voltage, the chopped voltage and the reference voltage obtained from the power factor corrector of FIG. 6.

FIG. 6 shows an exemplary circuit for the power factor corrector 30 of FIG. 4. In this embodiment, the line voltage Vin is divided by a voltage divider consisting of resistors $R_1$ and $R_2$ to generate a divided voltage Vd whose waveform 46 is shown in FIG. 7. In the voltage source 308, a voltage chopper 3082 clamps its input voltage under a maximum $V_{t1}$ when it passes therethrough, and therefore a chopped voltage Vd' is generated from the divided voltage Vd, as shown by the waveform 48 in FIG. 7. The chopped voltage Vd' is further inversely amplified by an amplifier 3084 to generate the reference voltage $V_{ref}$, as shown by the waveform 50 in FIG. 7. On the other hand, the output voltage $V_O$ is divided by a voltage divider consisting of resistors $R_3$ and $R_4$ to generate a feedback voltage $V_{FB}$, and an error amplifier 3161 in the current source 316 compares the feedback voltage $V_{FB}$ with a reference voltage $V_{ref2}$ to generate an error signal $V_{EA}$ whose phase is further compensated by a compensation network 3163. After inversely amplified by an amplifier 3162, the resultant signal is coupled to the base of a transistor 3164 to conduct a reference current Ia flowing through a resistor $R_9$ connected to the emitter of the transistor 3164. A current mirror 3166 connected to the collector of the transistor 3164 mirrors the reference current Ia to generate the charging current $I_C$ to charge the capacitor $C_{chg}$ to generate the charged voltage $V_C$ for the comparator 310 to compare with the reference voltage $V_{ref}$.

Figure 8:
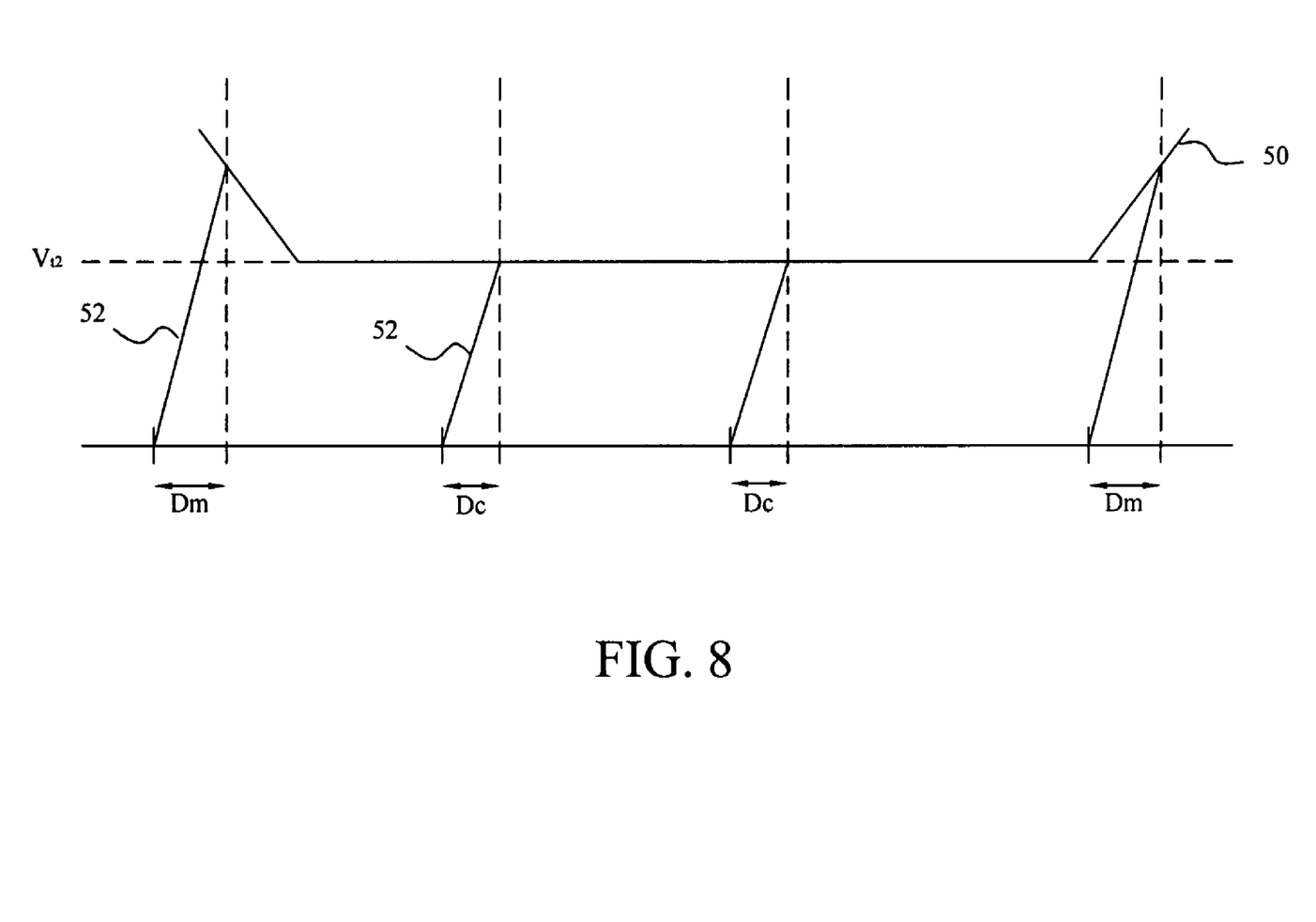
FIG. 8 shows a relationship between the reference voltage and the charged voltage obtained from the power factor corrector of FIG. 6.

FIG. 7 shows the schematic waveforms of the line voltage Vin, the divided voltage Vd, the chopped voltage Vd' and the reference voltage $V_{ref}$ obtained from the power factor corrector 30 of FIG. 6, designated with numerals 45, 46, 48 and 50, respectively. As illustrated, when the line voltage Vin is lower than the threshold $V_t$, the reference voltage $V_{ref}$ is inversely proportional to the line voltage Vin, and when the line voltage Vin is equal to or higher than the threshold $V_t$, the reference voltage $V_{ref}$ is a constant $V_{t2}$. FIG. 8 shows a relationship between the reference voltage $V_{ref}$ and the charged voltage $V_C$ on the capacitor $C_{chg}$, in which waveform 50 represents the reference voltage $V_{ref}$ and waveform 52 represents the charged voltage $V_C$. Referring to FIGS. 7 and 8, when the line voltage Vin is lower than the threshold $V_t$, it is inversely proportional to the reference voltage $V_{ref}$ and therefore, the lower the line voltage Vin is, the higher the reference voltage $V_{ref}$ is. In this case, it requires a longer charging time Dm for the charged voltage $V_C$ (waveform 52) to reach the reference voltage $V_{ref}$ (waveform 50) and thus the transistor 304 has a greater on-time. When the line voltage Vin increases, the charging time Dm reduces, and therefore the on-time of the transistor 304 reduces consequently, as shown in the region 442 of FIG. 5. Once the line voltage Vin equal to or higher than the threshold $V_t$, the reference voltage $V_{ref}$ (waveform 50) is maintained at $V_{t2}$ and accordingly, the charging time Dc is kept fixed and the on-time of the transistor 304 is maintained constant, as shown in the region 444 of FIG. 5.

Figure 9:
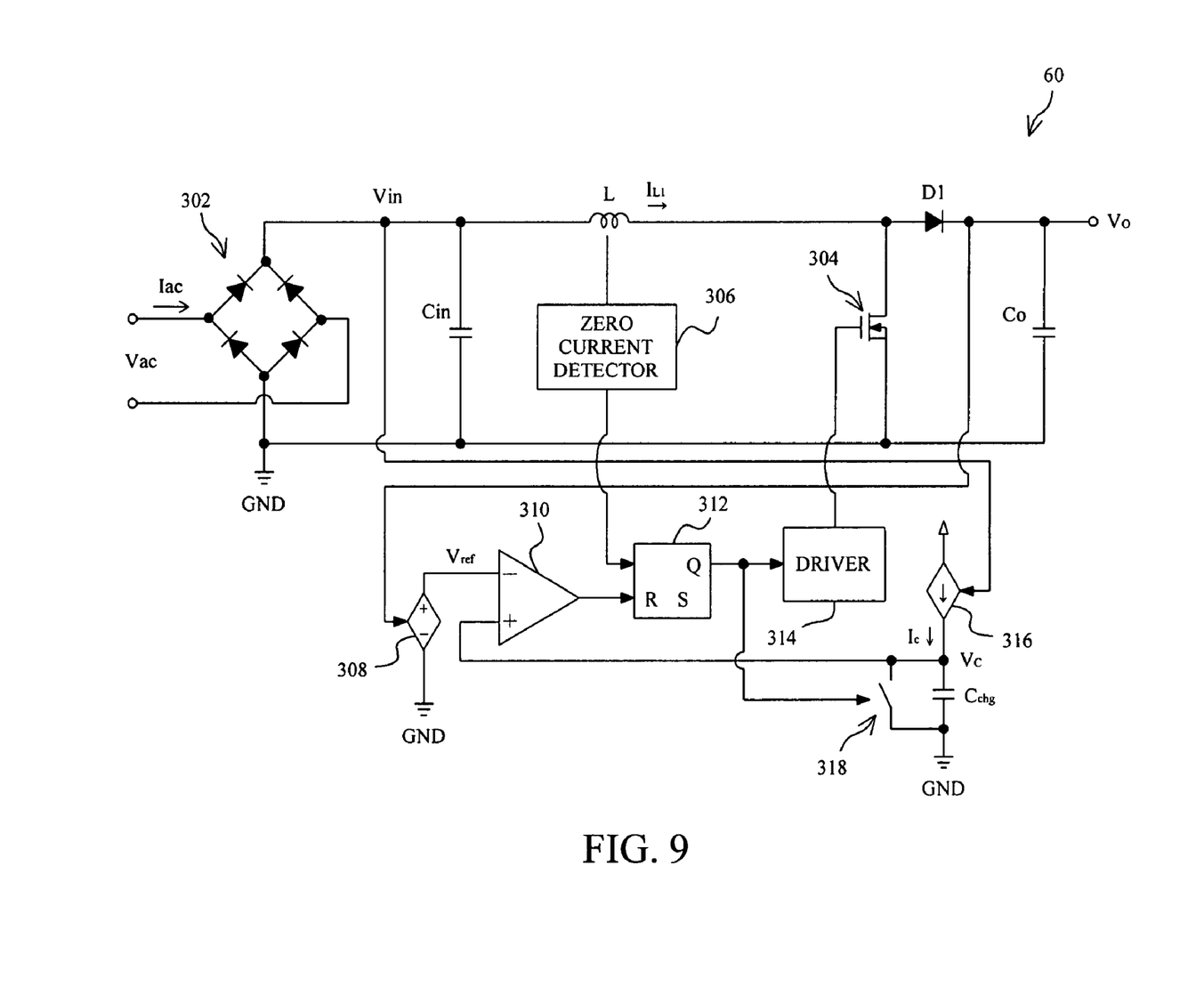
FIG. 9 shows another embodiment for a power factor corrector according to the present invention.

FIG. 9 shows another power factor corrector 60 according to the present invention. In this embodiment, the voltage source 308 generates the reference voltage $V_{ref}$ based on the output voltage $V_O$ and the current source 316 generates the charging current $I_C$ based on the line voltage Vin. When the line voltage Vin is lower than a threshold $V_t$, the charging current $I_C$ is proportional to the line voltage Vin. Since the charging current $I_C$ varies with the line voltage Vin, the on-time of the transistor 304 also varies with the line voltage Vin. On the other hand, when the line voltage Vin is equal to or higher than the threshold $V_t$, the charging current $I_C$ is maintained constant, and the on-time of the transistor 304 is fixed consequently. In addition, since the reference voltage $V_{ref}$ varies with the output voltage $V_O$, it will change as the output voltage $V_O$ changes. Due to the reference voltage $V_{ref}$ as a function of the output voltage $V_O$, if the output is low, the reference voltage $V_{ref}$ is set higher, and the capacitor $C_{chg}$ will take longer charging time to reach the reference voltage $V_{ref}$ and to reset the RS latch 312. As a result, the line current $I_L$ supplies more energy to the output and pull high the output voltage $V_O$. For example, when the output voltage $V_O$ decreases, the reference voltage $V_{ref}$ increases. As a result, the charging time for the capacitor $C_{chg}$ to reach the reference voltage $V_{ref}$ is prolonged, and the on-time of the transistor 304 becomes greater, such that the output voltage $V_O$ increases, i.e., a load regulation function is achieved during load varying. For the modulation operations, at the initial stage, the output Q of the RS latch 312 is high and the PWM switch 304 is at on-state, resulting in the line current $I_L$ ramping up. During the output Q of the RS latch 312 at high state, the discharge switch 318 turns off, and the current source 316 charges the capacitor $C_{chg}$ with the charging current $I_C$. Once the capacitor $C_{chg}$ is charged for the charged voltage $V_C$ thereon to reach the reference voltage $V_{ref}$, the comparator 310 resets the RS latch 312 by the comparison signal, and therefore the PWM switch 304 turns off, such that the boost capacitor $C_O$ is charged by the line current $I_L$. At the same time, the discharge switch 318 turns on by the output Q of the RS latch 312 to discharge the capacitor $C_{chg}$ rapidly. During the off state of the PWM switch 304, the line current $I_L$ decreases linearly to zero, triggering the zero current detector 306 to set the RS latch 312 by the detection signal for another new cycle.

Figure 10:
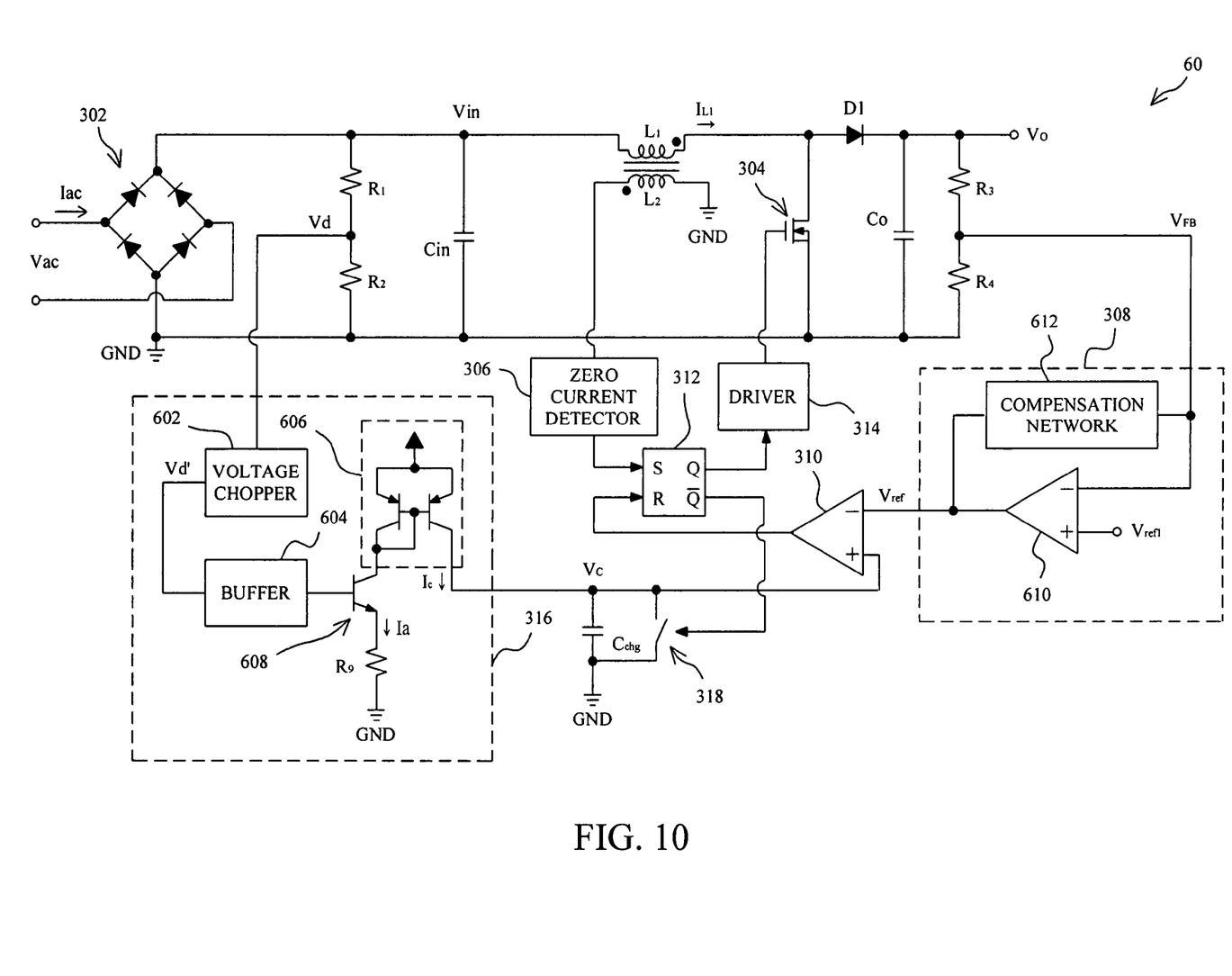
FIG. 10 shows an exemplary circuit for the power factor corrector of FIG. 9.
Figure 11:
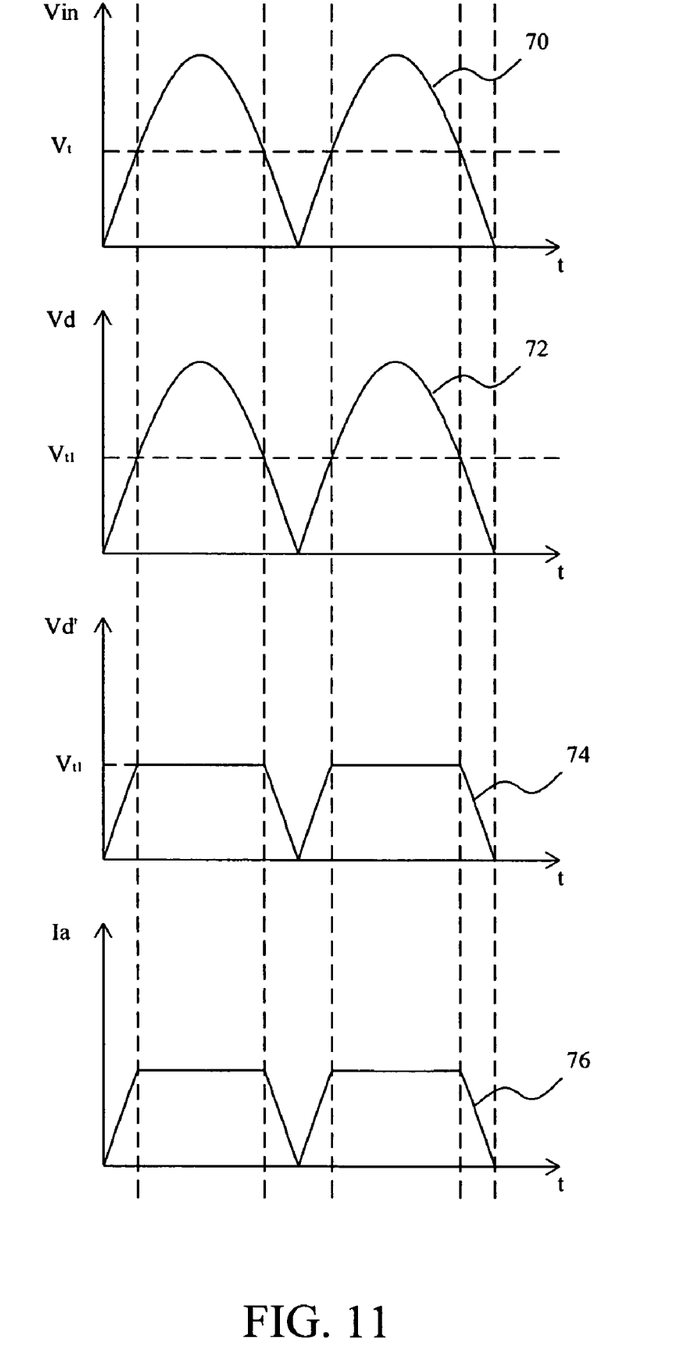
FIG. 11 shows the schematic waveforms of the line voltage, the divided voltage, the chopped voltage and the reference current obtained from the power factor corrector of FIG. 10.

FIG. 10 shows an exemplary circuit for the power factor corrector 60 of FIG. 9. As illustrated, the line voltage Vin is divided by a voltage divider consisting of resistors $R_1$ and $R_2$ to generate a divided voltage Vd for the current source 316, whose waveform 72 is shown in FIG. 11. In the current source 316, a voltage chopper 3082 clamps its input voltage under a maximum $V_{t1}$ when it passes therethrough, and thus generates a chopped voltage Vd' from the divided voltage Vd, as shown by the waveform 74 in FIG. 11. The chopped voltage Vd' is connected through a buffer 604 to the base of a transistor 608 to generate a reference current Ia flowing through a resistor $R_9$ connected to the emitter of the transistor 608 and having the waveform 76 shown in FIG. 11. A current mirror 606 mirrors the reference current Ia to generate a charging current $I_C$ to charge the capacitor $C_{chg}$ to thereby generate a charged voltage $V_C$ for one input of the comparator 310. Owing to the current mirror 606, the charging current $I_C$ has a waveform identical to that (waveform 76) of the reference current Ia. On the other hand, the output voltage $V_O$ is divided by a voltage divider consisting of resistors $R_3$ and $R_4$ to generate a feedback voltage $V_{FB}$, and an error amplifier 610 in the voltage source 308 compares the feedback voltage $V_{FB}$ with a reference voltage $V_{ref1}$ to generate the reference voltage $V_{ref}$ whose phase is further compensated by a compensation network 612. The comparator 310 compares the charged voltage $V_C$ on the capacitor $C_{chg}$ with the reference voltage $V_{ref}$ to generate a comparison signal for the reset input R of the SR latch 312, and the SR latch 312 switches the transistor 304 in response to the outputs of the comparator 310 and the zero current detector 306 in the same manner illustrated for the power factor corrector 30. However, unlike to the power factor corrector 30, this embodiment uses the complementary output $\overline{Q}$ to switch the capacitor $C_{chg}$ for charging thereon and discharging therefrom.

FIG. 11 shows the schematic waveforms of the line voltage Vin, the divided voltage Vd, the chopped voltage Vd' and the reference current Ia obtained from the power factor corrector 60 of FIG. 10, designated with numerals 70, 72, 74 and 76, respectively. Since the charging current $I_C$ is mirrored from the reference current Ia, it has the identical waveform as that (waveform 76) of the reference current Ia. When the line voltage Vin is lower than the threshold $V_t$, the charging current $I_C$ (and the reference voltage Ia also) is proportional to the line voltage Vin, and thus the charging time for the charged voltage $V_C$ to reach the reference voltage $V_{ref}$ also varies with the line voltage Vin. In this case, the on-time of the transistor 304 decreases as the line voltage Vin increases. When the line voltage Vin is equal to or higher than the threshold $V_t$, the charging current $I_C$ is maintained constant and the on-time of the transistor 304 is also kept constant accordingly.

Briefly, the on-time of the PWM switch 304 in the boost converter is piecewise varied with the line voltage Vin during the half-wave input voltage cycle. Namely, when Vin is higher than the threshold $V_t$, the on-time of the PWM switch 304 is constant, and when Vin is lower than the threshold $V_t$, the on-time of the PWM switch 304 is increased, i.e., the lower Vin generates the longer on-time. Although the SR latch 312 is used for the PWM generator in the above illustrated embodiments, those skilled in the art should understand other PWM generators may also applied from the teaching hereof for the piecewise on-time modulation. By using the piecewise on-time modulation apparatus and method of the present invention, a power factor corrector will increases the power factor of an AC-to-DC converter system and reduce the total harmonic distortion of the AC input current Iac.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A piecewise on-time modulation apparatus for a power factor corrector including a PWM switch to switch a line current generated from a line voltage derived by rectifying an AC input voltage so as to charge a boost capacitor to thereby generate an output voltage, the apparatus comprising:
   a voltage source for generating a reference voltage based on the line voltage;
   a current source for generating a charging current based on the output voltage to further generate a charged voltage;
   a comparator for comparing the charged voltage with the reference voltage to thereby generate a comparison signal; and
   a PWM generator in response to the comparison signal for generating a PWM signal for the PWM switch, wherein when the line voltage is lower than a threshold, the reference voltage decreases as the line voltage increases and when the line voltage is higher than the threshold, the line voltage is maintained constant.

2. The apparatus of claim 1, wherein the voltage source comprises:
   a voltage chopper connected with a first voltage proportional to the line voltage for chopping the first voltage to thereby generate a second voltage; and
   an amplifier for inversely amplifying the second voltage to thereby generate the reference voltage.

3. The apparatus of claim 1, wherein the current source comprises:
   an error amplifier for comparing a feedback voltage proportional to the output voltage with a second reference voltage to thereby generate an error signal;
   an amplifier for inversely amplifying the error signal to further generate a reference current; and
   a current mirror for mirroring the reference current to thereby generate the charging current.

4. The apparatus of claim 1, further comprising a zero current detector for generating a detection signal upon a zero line current to signal the PWM generator.

5. The apparatus of claim 4, wherein the PWM generator comprises an RS latch having a set input and a reset input to receive the detection signal and the comparison signal respectively, so as to determine the PWM signal.

6. A piecewise on-time modulation method for a power factor corrector including a PWM switch to switch a line current generated from a line voltage derived by rectifying an AC input voltage so as to charge a boost capacitor to thereby generate an output voltage, the method comprising the steps of:

generating a reference voltage from the line voltage;
generating a charging current from the output voltage;
generating a charged voltage from the charging current;
generating a comparison signal by comparing the charged voltage with the reference voltage; and
generating a PWM signal in response to the comparison signal for the PWM switch
comparing the line voltage to a threshold;
responsive to the line voltage being lower than the threshold, decreasing the reference voltage as the line voltage increases; and,
maintaining the line voltage constant responsive to the line voltage being higher than the threshold.

7. The method of claim 6, wherein the step of generating a reference voltage from the line voltage comprises the steps of:
chopping a first voltage proportional to the line voltage to thereby generate a second voltage; and
inversely amplifying the second voltage to thereby generate the reference voltage.

8. The method of claim 6, wherein the step of generating a charging current from the output voltage comprises the steps of:
comparing a feedback voltage proportional to the output voltage with a second reference voltage to thereby generate an error signal;
inversely amplifying the error signal;
generating a reference current from the amplified error signal; and
mirroring the reference current to thereby generate the charging current.

9. The method of claim 6, further comprising the step of detecting the line current to generate a detection signal upon a zero line current to determine the PWM signal.

10. A piecewise on-time modulation apparatus for a power factor corrector including a PWM switch to switch a line current generated from a line voltage derived by rectifying an AC input voltage so as to charge a boost capacitor to thereby generate an output voltage, the apparatus comprising:
a voltage source for generating a reference voltage based on the output voltage;
a current source for generating a charging current based on the line voltage to further generate a charged voltage;
a comparator for comparing the charged voltage with the reference voltage to thereby generate a comparison signal; and
a PWM generator in response to the comparison signal for generating a PWM signal for the PWM switch;
wherein the current source comprises:
a voltage chopper connected with a first voltage proportional to the line voltage for chopping the first voltage to thereby generate a second voltage to further generate a reference current; and
a current mirror for mirroring the reference current to thereby generate the charging current.

11. A piecewise on-time modulation method for a power factor corrector including a PWM switch to switch a line current generated from a line voltage derived by rectifying an AC input voltage so as to charge a boost capacitor to thereby generate an output voltage, the method comprising the steps of:
generating a reference voltage from the output voltage;
generating a charging current from the line voltage;
generating a charged voltage from the charging current;
generating a comparison signal by comparing the charged voltage with the reference voltage; and
generating a PWM signal in response to the comparison signal for the PWM switch;
wherein the step of generating a charging current from the line voltage comprises the steps of:
chopping a first voltage proportional to the line voltage to thereby generate a second voltage;
generating a reference current from the second voltage; and
mirroring the reference current to thereby generate the charging current.

* * * * *